United States Patent [19]
Hendrick, Jr.

[11] Patent Number: 5,136,164
[45] Date of Patent: Aug. 4, 1992

[54] INFRARED DETECTORS ARRAYS WITH ENHANCED TOLERANCE TO IONIZING NUCLEAR RADIATION

[75] Inventor: Roy W. Hendrick, Jr., Goleta, Calif.

[73] Assignee: Mission Research Corporation, Calif.

[21] Appl. No.: 257,379

[22] Filed: Oct. 13, 1988

[51] Int. Cl.⁵ .............................. G01J 5/06; G01J 5/08
[52] U.S. Cl. ..................................... 250/353; 250/349
[58] Field of Search .................... 250/349, 353, 332

[56] References Cited

U.S. PATENT DOCUMENTS

| | | | |
|---|---|---|---|
| 3,397,314 | 8/1968 | Weiner | 250/349 |
| 4,016,416 | 4/1977 | Shepherd, Jr. et al. | 250/211 J |
| 4,734,585 | 3/1988 | Owers | 250/349 |

*Primary Examiner*—Carolyn E. Fields
*Attorney, Agent, or Firm*—Donald D. Mon

[57] ABSTRACT

An array of individual infrared detectors is comprised of optimally small individual detectors, whose reduced size is enabled by immersion optics which reduce the wavelength of the radiation incident on the detectors, and by the use of individual field lenses- Fresnel lenses, for each detector.

4 Claims, 1 Drawing Sheet

INFRARED DETECTORS ARRAYS WITH ENHANCED TOLERANCE TO IONIZING NUCLEAR RADIATION

FIELD OF THE INVENTION

This invention relates to infrared detectors with enhanced tolerance to ionizing nuclear radiation.

BACKGROUND OF THE INVENTION

Infrared detectors are required to have a substantial sensitivity to infrared radiation, which is a simple objective to attain. However in some applications these detectors will also be exposed to severe flux of ionizing nuclear radiation (neutrons, gamma rays and beta rays, sometimes called "hard" radiation), which severely inhibit their performance to such an extent that their response is unreliable.

This situation has long been recognized, and efforts have been made to correct it. One straight-forward approach is to recognize that the infrared radiation, which is of critical importance to sense and to measure can be focused, while the ionizing radiation cannot be focused. It simply passes straight through the system, and can damage infrared sensors, the damage being roughly proportional to the amount of hard radiation that impinges on it.

It follows, and has long been recognized, that if the infrared radiation from some larger aperture is focused on a smaller area of sensor, then this smaller area receives all of the infrared radiation but this smaller area receives only a much smaller proportion of the ionizing radiation, much or most of which passes through the system and misses the sensor. Thus the reduction in area of the sensor gives up nothing as to sensitivity to infrared radiation, but because of its smaller area it significantly reduces its own exposure to the ionizing radiation.

This correct theory has been applied quite satisfactorily, except that it has an undesirably high limit of resolution. This limit is known as diffraction-limited. It is an object of this invention significantly to overcome this quantum mechanical limit, and thereby enable the employment of smaller sensors. In fact, with this invention the required detector size can be reduced in linear extent by about one order of magnitude, and in area by about two orders of magnitude, thereby similarly decreasing the risk of disablement of the sensor. This invention can thereby provide greatly increased tolerance (hardening) to ionizing radiation.

A detector according to this invention utilizes an array of reduced-area infrared detectors in immersion contact with a refracting body that terminates in a plurality of Fresnel lenses which act as field lenses. One such lens and one such detector are respective to each other in the array. The refractive body is a continuous structure from said detectors to said lenses.

It is a feature of this invention that the body (of which the Fresnel lens are constituted) has a substantial index of refraction relative to infrared wavelengths.

By combining the use of Fresnel lenses and immersion optics of the class described herein, the diffraction limits can be greatly reduced.

BRIEF DESCRIPTION OF THE INVENTION

A detector array according to this invention comprises a group of spaced apart individual detectors overlaid and immersed by and in a refractive medium. This medium is surmounted by an integral array of Fresnel lenses, one respective to each detector, the lenses occupying the full exposed surface of the array.

According to a preferred but optional feature of the invention, the lens array is developed by an etching process.

The above and other features of this invention will be fully understood from the following detailed description and the accompanying drawings, in which:

DETAILED DESCRIPTION OF THE INVENTION

Figure 1:
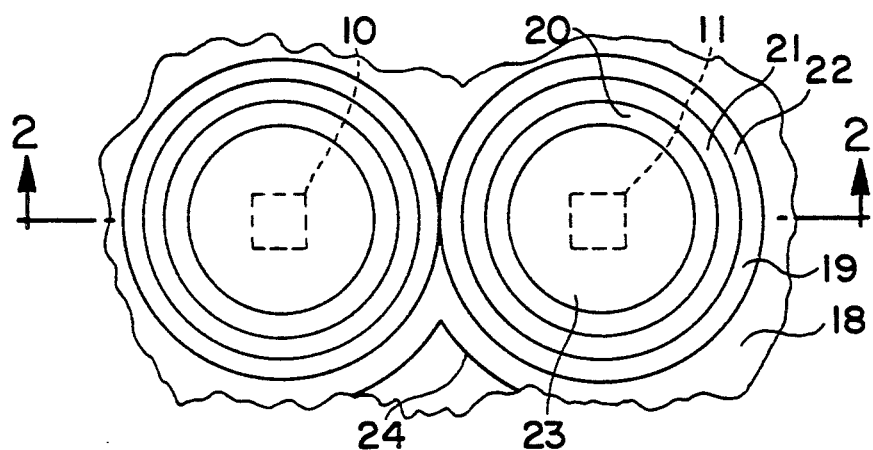
FIG. 1 is a plan view of a detector array according to the invention.
Figure 2:
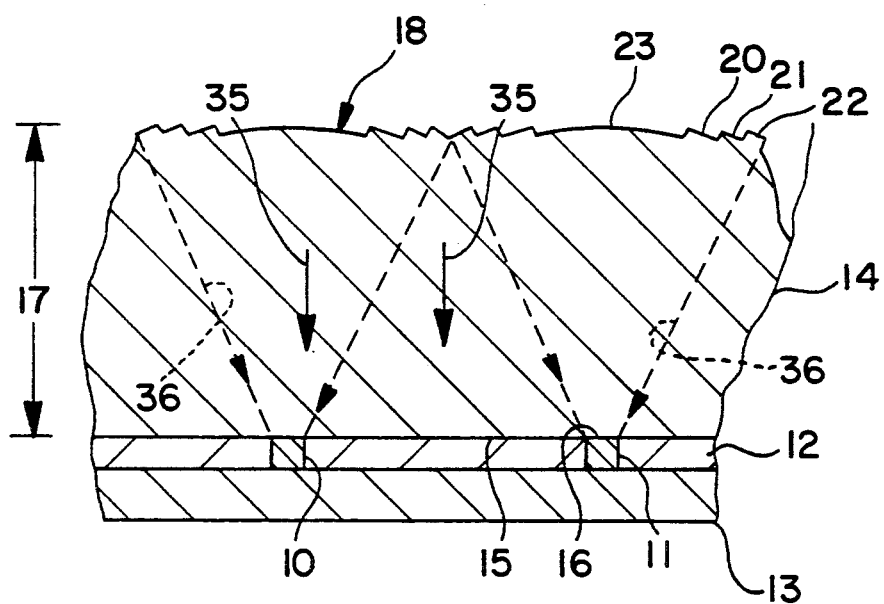
FIG. 2 is a cross-section taken at line 2—3 in FIG. 1.

FIGS. 1 and 2 show two individual detectors 10, 11 which form part of an array of such detectors. They are spaced apart from one another. These two detectors extend along an axis which is an extension of a line between detectors 10 and 11. Others (not shown) extend along an axis normal to that line. They may conveniently be held in a matrix 12 of some suitable material for ease in handling. With the matrix they can be mounted onto a substrate 13 for mechanical support and to facilitate connection into circuitry.

The individual detectors are very small- preferably on the order of about 10 um on a side when squarely shaped as preferred, and are best spaced apart by about 100 um center to center. Their thickness is arbitrary, and any detector or detector material which is effective in detecting infrared radiation is suitable.

Circuit connections will be provided in accordance with conventional arrangements which are not pertinent to this invention. There will be a very large number of these detectors in any useful array, and the drawings are greatly magnified and simplified for convenience in disclosure.

A refractive layer 14 of a refractive medium is placed in intimate contact with the detectors. Its face 15 abuts them so layer 14 acts as an immersion medium relative to the active surface 16 of the detectors.

Layer 14 is preferably about 100 mm thick (dimension 17). Its exposed surface 18 is modified by a plurality of identical Fresnel lenses 19 formed as an integral part of the exposed surface. There is one of these lenses for each detector, each being on center with its respective detector. The entire area of surface 18 will be covered by lens structure, although not all of it will be covered by a complete ring. Corner areas where the lenses intersect will have only fragments of rings. In any event, the full surface area will be focused onto some detector.

Each Fresnel lens acts as a field lens. All of its rings and fragments have the same focal point or area. When the step depth between segments is chosen to change the optical path length for the incident (IR) radiation by an integer multiple of its wavelength, then the assemblage of rings and segments will perform as if it is a single lens.

For ease in fabrication the incremental path length between the ring segments (steps) can be made one wavelength. The required shaping and depth can readily be attained by etching an initially flat surface, using a series of etching steps, each of which removes a different depth and has its own processing mask applied and used with standard photolithographic or photoresist techniques.

The drawings schematically show complete rings 20, 21, 22, with a central curved section 23. Segments such as segment 24 occupy the corners of the lens structure. The shapes are entirely consistent with known Fresnel lens structures and require no detailed description here.

For ease in fabrication, and because of its useful index of refraction relative to infrared radiation, silicon is the preferred material for layer 14. Its refractive index is about 3.4. Other useful materials are CdTe alloy whose refractive index is about 3.3 and ZnSe alloy, whose refractive index is about 2.7. These materials are transmissive to infrared radiation, and are uncovered with anything that might reflect or absorb it.

The reduction of size of the detectors in order to harden the array against hard radiation has long been a useful objective. However the minimum size of the detractor is diffraction limited. The quantum mechanical limit for detector size is as follows:

$$l_5 = (f/\#)\lambda$$

In this equation, $l_5$ is the linear dimension of the detector, a is a factor which is of the order of 2 or 3 and $\lambda$ is the wavelength of the infrared radiation, f/# is the optics f number.

For known sensors which use a large array of detectors, f/190 is typically of the order of 3, and $\lambda$ is taken to be the wavelength in air.

This invention reduces both the wavelength and the optical speed (f number). With the use of a field lens (the Fresnel lenses), the optics f number can be reduced to an effective value of nearly one. By using a high refractive index immersion medium, the wavelength can be reduced by the index of refraction (which can be on the order of 2.7 to 3.4). Thus there can readily be a reduction of about ⅓ for each of the elements of the limiting equation—optical speed and wavelength.

Because the tolerance factor to ionizing radiation is a square function, this constitutes an improvement of nearly two orders of magnitude. This fact is evident from FIG. 2 where arrows 35 are intended to show ionizing radiation, which is not focused. It passes straight through the array. The smaller the total area of detectors, the less risk there is of impingement on the detectors.

On the other hand, the infrared radiation to which the array is to respond is focussed. These rays are shown schematically as rays 36.

Thus by the combined usage of a field lens structure and of immersion optics, a very substantial improvement in protection of sensor arrays can be attained.

Because it is an object of this invention to be optimally sensitive to infrared radiation, and minimally sensitive to hard radiation, the sensitive surfaces of the detectors face directly toward surface 18, and receive radiation which has passed through it and has been focused by the lenses. Had the infrared radiation impinged on the device from the detector side, passed through the refractive layer once, been reflected and focused, and passed again through the layer, then infrared radiation respective to the area of the detector could be screened from detection because it would not have passed through the refractive medium. It is a feature of this invention that the infrared radiation passes only once through the refractive layer 14, and all of it can be focussed on some detector.

This invention is not to be limited by the embodiment shown in the drawings and described in the description, which is given by way of example and not of limitation, but only in accordance with the scope of the appended claims.

I claim:

1. A detector array for detecting infrared radiation, comprising:

a plurality of spaced apart individual infrared detectors;

a layer of material transparent to infrared radiation having an index of refraction higher than that of air, said layer having a first surface in intimate surface contact with said detectors, and a second exposed surface;

said second surface having as an integral part, a plurality of field lenses formed as Fresnel lenses entirely covering said second surface, one for each of said detectors and aligned therewith, said lenses and said layer being so proportioned and arranged as to minimize the optical number f, said second surface being free of anything which might reflect or absorb infrared radiation, whereby infrared radiation incident on said Fresnel lenses passes directly through said second surface and refractive layer to said detectors.

2. An array according to claim 1 in which said layer is made from a material selected from the group consisting of silicon, CdTe alloys, and ZnSe alloys.

3. A detector array according to claim 1 in which said field lenses comprise concentric steps, the incremental path length between adjacent steps being approximately an integral multiple of the wavelength of the infrared radiation of interest.

4. A detector array for detecting infrared radiation, comprising:

a plurality of spaced apart individual infrared detectors;

a layer of material transparent to infrared radiation having an index of refraction higher than that of air, said layer having a first surface in intimate surface contact with said detectors, and a second exposed surface;

said second surface having as an integral part, a plurality of field lenses formed as Frensel lenses entirely covering said second surface, one for each of said detectors and aligned therewith, said lenses and said layer being so proportioned and arranged as to minimize the optical number f, said second surface being free of anything which might reflect or absorb infrared radiation, wherein infrared radiation incident on said Fresnel lenses passes directly through said second surface and refractive layer to said detectors, wherein said field lenses are made by etching of an initially flat surface.

* * * * *